United States Patent
Sato et al.

(10) Patent No.: US 11,507,085 B2
(45) Date of Patent: Nov. 22, 2022

(54) VEHICLE CONTROL APPARATUS

(71) Applicant: Toyota Jidosha Kabushiki Kaisha, Toyota (JP)

(72) Inventors: Minami Sato, Ebina (JP); Kazuyuki Fujita, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 88 days.

(21) Appl. No.: 16/752,967

(22) Filed: Jan. 27, 2020

(65) Prior Publication Data
US 2020/0241527 A1 Jul. 30, 2020

(30) Foreign Application Priority Data
Jan. 29, 2019 (JP) .............................. JP2019-013026

(51) Int. Cl.
| | | |
|---|---|---|
| *G05D 1/00* | (2006.01) | |
| *G08G 1/16* | (2006.01) | |
| *G05D 1/02* | (2020.01) | |
| *B62D 6/02* | (2006.01) | |
| *G06V 20/58* | (2022.01) | |

(52) U.S. Cl.
CPC ............ *G05D 1/0061* (2013.01); *B62D 6/02* (2013.01); *G05D 1/0214* (2013.01); *G06V 20/58* (2022.01); *G08G 1/16* (2013.01)

(58) Field of Classification Search
CPC ............ G05D 1/0061; G05D 1/0214; G05D 2201/0212; B62D 6/001; B62D 6/02; G06K 9/00805; G08G 1/16
See application file for complete search history.

(56) References Cited

U.S. PATENT DOCUMENTS

| | | | | |
|---|---|---|---|---|
| 9,701,307 | B1* | 7/2017 | Newman | B60W 10/184 |
| 9,758,176 | B2* | 9/2017 | Mizutani | B60K 35/00 |
| 10,156,850 | B1* | 12/2018 | Ansari | B60W 30/095 |
| 11,016,493 | B2* | 5/2021 | Taylor | G05D 1/0223 |
| 2017/0025017 | A1* | 1/2017 | Thomas | B60W 30/08 |
| 2017/0269602 | A1* | 9/2017 | Nakamura | G01C 21/3492 |
| 2017/0327094 | A1 | 11/2017 | Inoue et al. | |
| 2019/0088137 | A1* | 3/2019 | Yamada | B60R 1/06 |
| 2019/0196487 | A1* | 6/2019 | Akiyama | B60W 30/0956 |
| 2019/0202450 | A1* | 7/2019 | Maeda | B60W 30/09 |

(Continued)

FOREIGN PATENT DOCUMENTS

| | | |
|---|---|---|
| JP | 2017-206039 A | 11/2017 |
| JP | 2018140735 A | 9/2018 |

*Primary Examiner* — Jeff A Burke
*Assistant Examiner* — Jerrod Irvin Davis
(74) *Attorney, Agent, or Firm* — Dinsmore & Shohl LLP (57) ABSTRACT

A vehicle control apparatus is configured to perform a steering assistance control of steering a vehicle to move away from an obstacle to avoid when the obstacle is in a steering assistance range. The vehicle control apparatus is provided with: a determinator configured to determine a steering assistance amount associated with the steering assistance control for the obstacle, on the basis of a distance between two of a plurality of obstacles in a direction of travel of the vehicle, when the plurality of obstacles are in the steering assistance range: and a controller programmed to control the vehicle to perform the steering assistance control by using the steering assistance amount determined by the determinator.

13 Claims, 7 Drawing Sheets

(56) References Cited

U.S. PATENT DOCUMENTS

| | | | | |
|---|---|---|---|---|
| 2019/0318177 A1* | 10/2019 | Steinberg | ............... | G01S 17/89 |
| 2020/0070819 A1* | 3/2020 | Tominaga | .............. | G08G 1/166 |
| 2020/0081443 A1* | 3/2020 | Nakata | ................ | G05D 1/0088 |
| 2020/0110407 A1* | 4/2020 | Miura | ...................... | B60S 1/56 |
| 2020/0298842 A1* | 9/2020 | Takamatsu | .......... | B60W 60/001 |
| 2020/0398894 A1* | 12/2020 | Hudecek | ............. | G05D 1/0212 |
| 2021/0031763 A1* | 2/2021 | Takaki | ............. | B60W 30/0956 |
| 2021/0034925 A1* | 2/2021 | Ogata | ................. | G06K 9/6262 |
| 2021/0221367 A1* | 7/2021 | Hiramatsu | ............ | B60W 30/09 |
| 2021/0387615 A1* | 12/2021 | Aoki | .................... | B60W 30/09 |

* cited by examiner

VEHICLE CONTROL APPARATUS

CROSS-REFERENCE TO REQ LAT APPLICATIONS

This application is based upon and claims the benefit of priority to Japanese Patent Application No. 2019-013026, filed on Jan. 29, 2019, the entire contents of which are incorporated herein: by reference.

BACKGROUND

1. Technical Field

Embodiments of the present disclosure relate to a vehicle control apparatus configured to control a vehicle when there is an obstacle.

2. Description of the Related Art

For this type of apparatus, there is known an apparatus configured to perform a control for avoiding a collision between a vehicle and an avoidance target located ahead of the vehicle (hereinafter referred to as an "avoidance assistance control", as occasion demands). For example, Japanese Patent Application. Laid Open No. 2017-206039 (Patent Literature 1) discloses a technology/technique in which a steering control of a host vehicle is performed to avoid an obstacle when the obstacle is in a predetermined steering assistance range.

In a steering assistance control, a steering assistance amount may be set as a value at which a sufficient lateral distance from an obstacle to avoid (e.g., a lateral distance at which a collision can be safely avoided) can be ensured. If there are a plurality of obstacles ahead of the vehicle, however, the steering assistance control is continuously performed, and thus, the steering assistance amount may have an optimum value. Specifically, depending on a distance between the obstacles, the steering assistance amount may be excessive or insufficient.

In view of the aforementioned problem, is therefore an object of embodiments of the present disclosure to provide a vehicle control apparatus that can perform an appropriate steering control when there are a plurality of obstacles.

An aspect of a vehicle control apparatus according to the present disclosure is a vehicle control apparatus configured to perform a steering assistance control of steering a vehicle to move away from an obstacle to avoid when the obstacle is in a steering assistance range, the vehicle control apparatus provided with: a determinator configured to determine a steering assistance amount associated with the steering assistance control for the obstacle, on the basis of a distance between two of a plurality of obstacles in a direction of travel of the vehicle, when the plurality of obstacles are in the steering assistance range; and a controller programmed to control the vehicle to perform the steering assistance control by using the steering assistance amount determined by the determinator.

DETAILED DESCRIPTION OF THE EMBODIMENT

Hereinafter, a vehicle control apparatus according to an embodiment of the present disclosure will be explained with reference to the drawings.

<Configuration of Apparatus>

Figure 1:
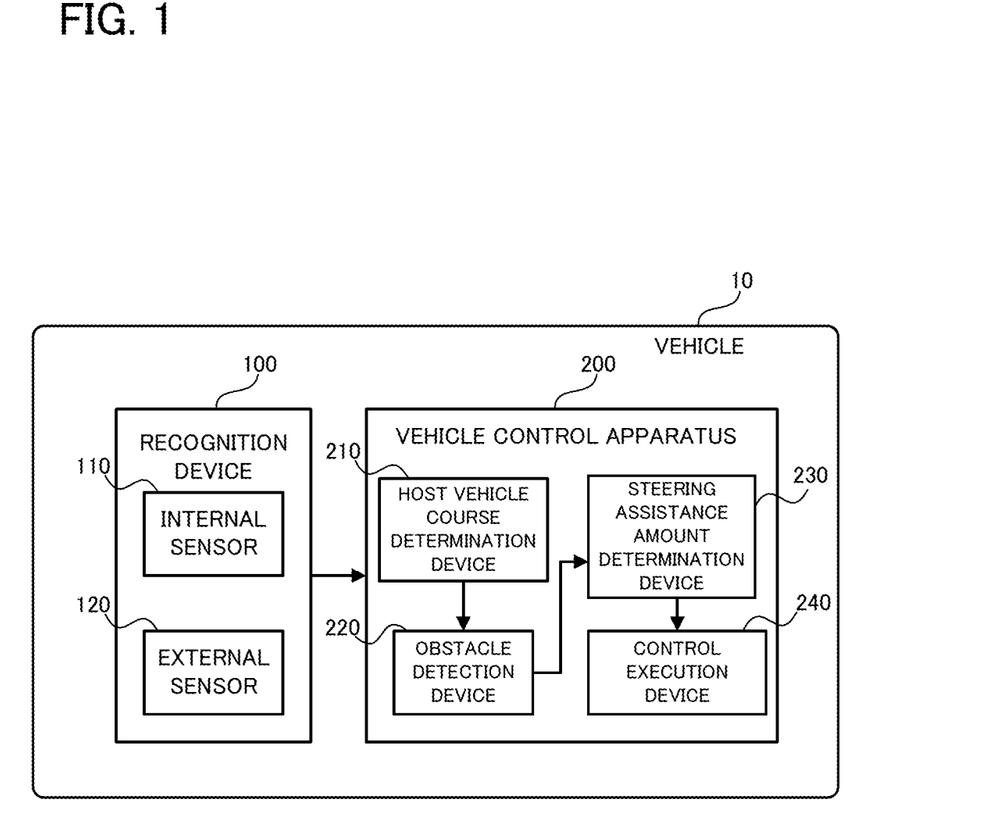
FIG. 1 is a block diagram illustrating a configuration of a vehicle according to an embodiment.

Firstly, a configuration of a vehicle control apparatus according to the embodiment will be explained with reference to FIG. 1. FIG. 1 is a block diagram illustrating a configuration of a vehicle according to the embodiment.

As illustrated in FIG. 1, a vehicle 10 according to the embodiment is provided with a recognition device 100 and a vehicle control apparatus 200.

The recognition device 100 is configured to recognize (in other words, obtain) various information used for a steering assistance control performed by the vehicle control apparatus 200, and is provided with an internal sensor 110 and an external sensor 120. The internal sensor 110 may be a sensor group that can detect various parameters of the vehicle 10 (e.g., a vehicle speed, acceleration, a steering angle a yaw rate, etc.). The external sensor 120 may be a sensor group that can recognize information about a surrounding situation of the vehicle 10 (in particular, information about an object, such as another vehicle, a pedestrian, and a bicycle), an may include, for example, an in-vehicle camera, a radar, laser imaging detection and ranging (LIDAR). The information recognized by the recognition device 100 may be outputted to the vehicle control apparatus 200.

The vehicle control apparatus 200 is configured to perform a steering assistance control of automatically assisting in steering the vehicle 10 (specifically, a control of steering the vehicle 10 to move away from an obstacle). The vehicle control apparatus 200 is configured, for example, as an electronic control unit (ECU) mounted on the vehicle 10. The vehicle control apparatus 200 is provided with a host vehicle course determination device 210, an obstacle detection device 220, a steering assistance amount determination device 230, and a control implementation device 240, as logical processing blocks or physical processing circuits for realizing functions thereof.

The host vehicle course determination device 210 is configured to determine a course of the vehicle 10, on the basis of the information recognized by the recognition device 100. More specifically, the host vehicle course determination device 210 can determine the course of the vehicle 10 and a traffic lane on which the vehicle 10 travels, by using information such as, for example, a steering angle of the vehicle 10 and a surrounding mark line. A determination result of the host vehicle course determination device 210 may be outputted to the obstacle detection device 220.

The obstacle detection device 220 is configured to determine whether or not there is an obstacle (which is specifically an object that is to be a target for the steering assistance control) ahead of the vehicle 10, on the basis of the information recognized by the recognition device 100 and the termination result of the host vehicle course determination device 210. A detailed explanation of a specific method of determining an obstacle will be omitted herein because the existing technologies/techniques can be applied to the method, as occasion demands. A determination result of the obstacle detection device 220 may be outputted to the steering assistance amount determination device 230.

The steering assistance amount determination device 230 is configured to determine a steering assistance amount for avoiding an obstacle (i.e., an amount of steering the vehicle 10 in the steering assistance control), on the basis of information about the obstacle detected by the obstacle detection device 220. The steering assistance amount determination device 230 according to the embodiment is particularly configured to determine the steering assistance amount in accordance with a distance between a plurality of obstacles. More specific operations of the steering assistance amount determination device 230 will be described later. The steering assistance amount determined by the steering assistance amount determination device 230 may be outputted to the control execution device 240. The steering assistance amount determination device 230 is a specific example of the "determinator" in Supplementary Notes described later.

The control execution device 240 is configured to perform the steering assistance control on the basis of the steering assistance amount determined by the steering assistance amount determination device 230. Specifically, the control execution device 240 may perform the steering assistance control by controlling operations of a not-illustrated steering actuator of the vehicle 10 or the like. The steering assistance control may include not only a steering control of the vehicle 10 but also a deceleration control. The control execution device 240 is a specific example of the "controller" in Supplementary Notes described later.

<Overall Operations>

Figure 2:
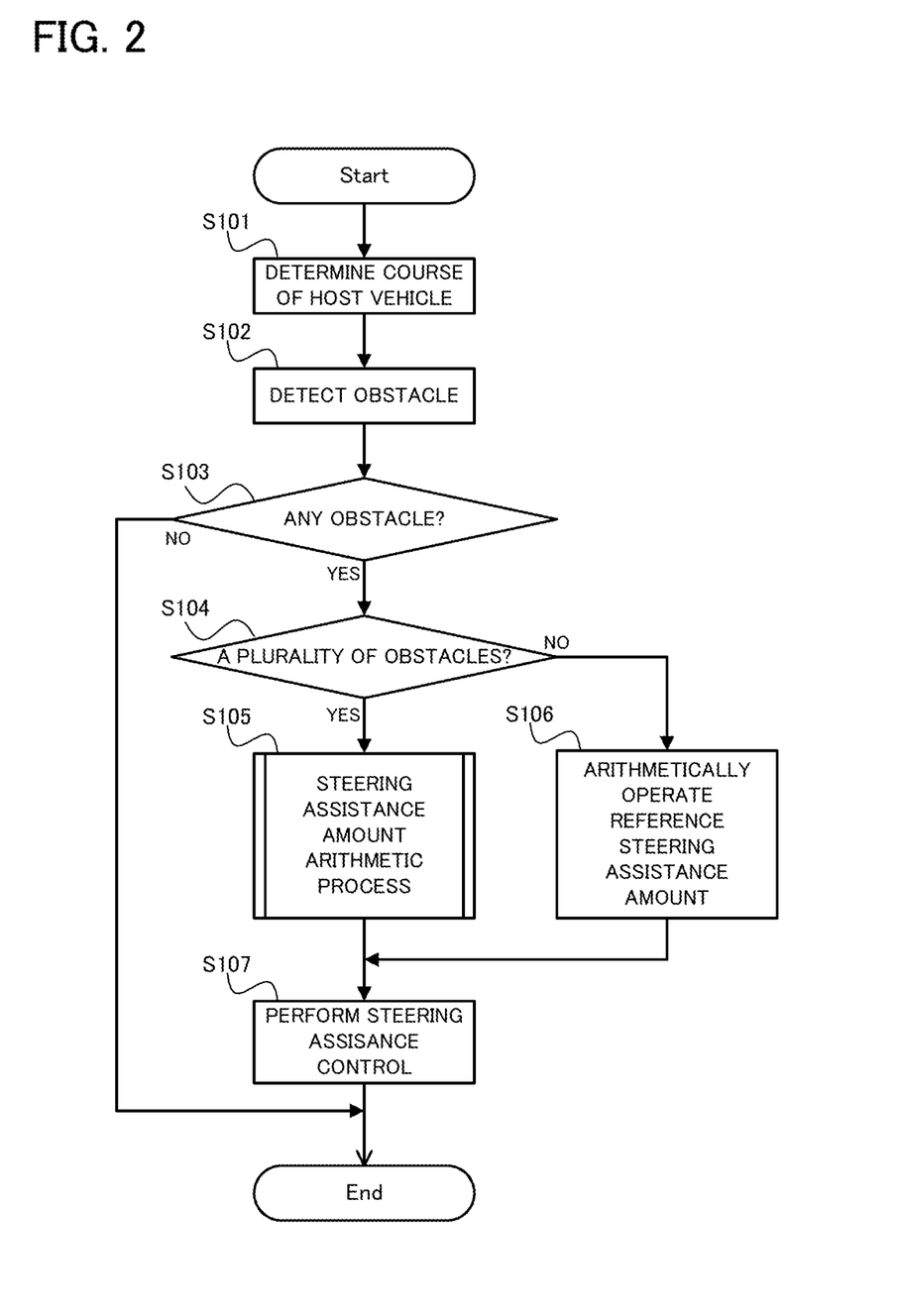
FIG. 2 is a flowchart illustrating a flow of operations of a vehicle control apparatus according to the embodiment.

A flow of overall operations of the vehicle control apparatus 200 according to the embodiment will be explained with reference to FIG. 2. FIG. 2 is a flowchart illustrating the flow of operations of the vehicle control apparatus according to the embodiment.

As illustrated in FIG. 2, in operation of the vehicle control apparatus 200 according to the embodiment, firstly, the host vehicle course determination device 210 determines the course of the vehicle 10, on the basis of the information from the recognition device 100 (step S101). Then, the obstacle detection device 220 performs an operation of detecting an obstacle located ahead of the vehicle 10, on the basis of the information from the recognition device 100 and the determination result of the host vehicle course determination device 210 (step S102). The host vehicle course determination device 210 may detect an obstacle in a predetermined assistance range.

The obstacle detection device 220 then determines whether or not there is an obstacle (i.e., whether or not an obstacle is detected in the assistance range of the vehicle 10) (step S103). If it is determined that there is no obstacle (step S103: NO), the subsequent process is omitted, and a series of steps is ended. In other words, if there is no obstacle, each of steps regarding the steering assistance control described later is not performed. In this case, the step S101 is restarted after a lapse of a predetermined period.

On the other hand, if it is determined that there is an obstacle (step S103: YES), the obstacle detection device 220 further determines whether or not there are a plurality of obstacles (i.e., whether or not two or more different obstacles are detected in the assistance range of the vehicle 10) (step S104).

If it is determined that there are a plurality of obstacles (the step S104: YES), the steering assistance amount determination device 230 performs a steering assistance amount arithmetic process based on a distance between the plurality of obstacles (step S105). The steering assistance amount arithmetic process will be explained in detail later. On the other hand, if it is determined that there are not a plurality of obstacles (i.e., that there is only one obstacle) (the step S104: NO), the steering assistance amount determination device 230 arithmetically operates a reference steering assistance amount corresponding to the existing obstacle (step S106). In other words, the steering assistance amount determination device 230 arithmetically operates a steering assistance amount at which the existing obstacle can be safely passed (specifically, a steering assistance amount in which a lateral distance between the vehicle 10 and the obstacle (=a distance in a vehicle width direction) is greater than or equal to a predetermined distance). A detailed explanation of a more specific method of arithmetically operating the reference steering assistance amount will be omitted herein because the existing technologies/techniques can be applied to the method as occasion demands.

Then, the control execution device 240 performs the steeling assistance control on the basis of the steering assistance amount determined by the steering assistance amount determination device 230 (step S107). Specifically, the control execution device 240 may perform the steering assistance control, on the basis of the steering assistance amount arithmetically operated in the steering assistance amount arithmetic process in the step S105, or the reference steering assistance amount arithmetically operated in the step S106.

<Steering Assistance Amount Arithmetic Process>

Figure 3:
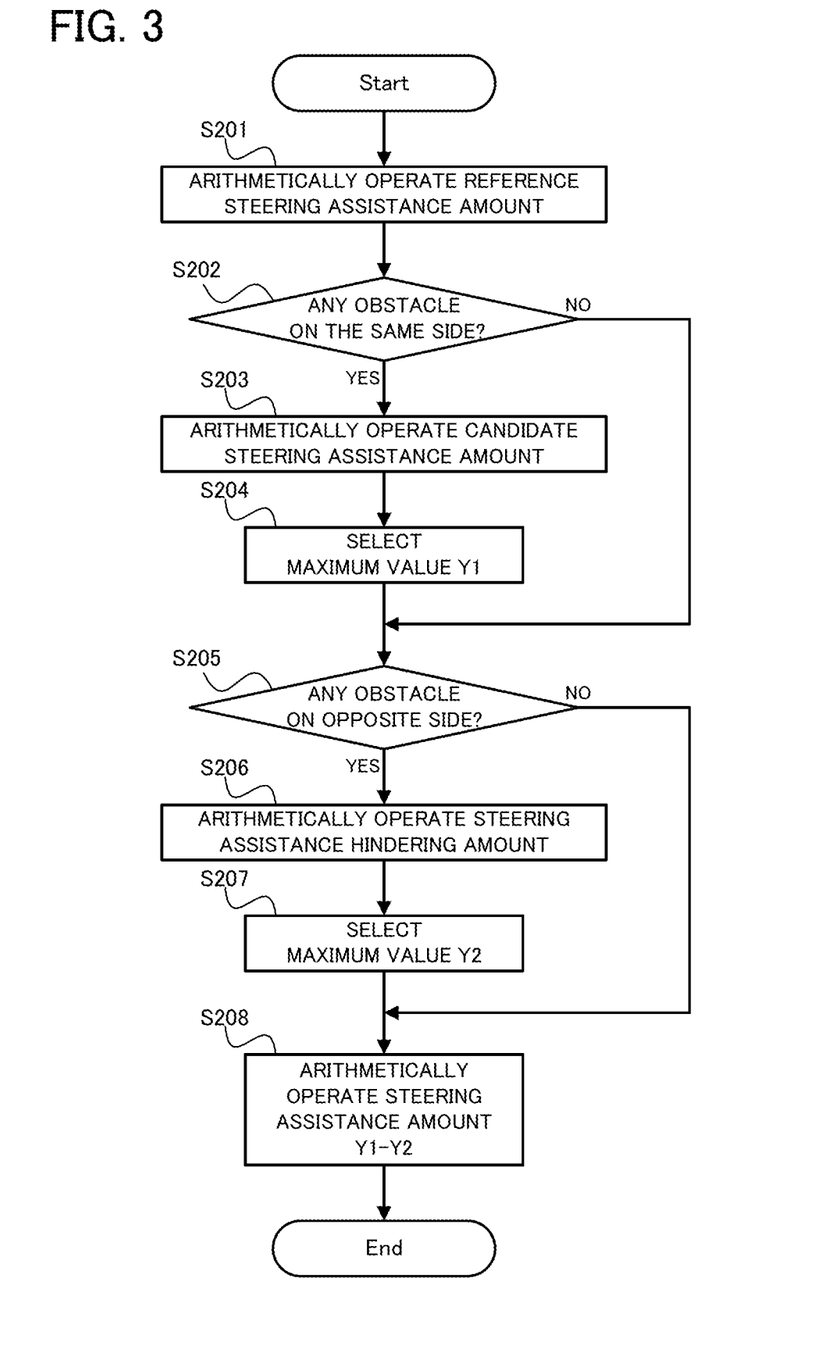
FIG. 3 is a flowchart illustrating a flow of operations of a steering assistance amount arithmetic process.

Next, a specific content of the steering assistance amount arithmetic process described above (i.e., the step S105 in FIG. 2) will be explained with reference to FIG. 3. FIG. 3 is a flowchart illustrating a flow of operations of the steering assistance amount arithmetic process.

As illustrated in FIG. 3, when the steering assistance amount arithmetic process is started, the steering assistance amount determination device 230 firstly arithmetically operates the reference steering assistance amount of an obstacle (step S201). In other words, the same process as in the step S106 in FIG. 2 is performed. Here, however, a plurality of obstacles are detected, and thus, the reference steering assistance amount is arithmetically operated for each of the plurality of obstacles.

The steering assistance amount determination device 230 then determines whether or not there is another obstacle on the same side in a lateral direction as the obstacle that is a target for arithmetically operating the steering assistance amount (hereinafter referred to as a "target obstacle"), out of the plurality of obstacles (step S202). In other words, if the target obstacle is located on the right side as viewed from the vehicle 10, it is determined whether or not there is another obstacle on the right side. If the target obstacle is located on the left side as viewed from the vehicle 10, it is determined whether or not there is another obstacle on the left side.

If it is determined that there is another obstacle on the same side as the target obstacle (the step S202: YES), the steering assistance amount determination device 230 arithmetically operates a candidate steering assistance amount corresponding to the other obstacle located on the same side as the target obstacle (step S203). The candidate steering assistance amount can be calculated on the basis of the reference steering assistance amount of the other obstacle and a distance (or a longitudinal distance=a distance in a direction of travel of the vehicle) between the target obstacle and the other obstacle. A specific calculation formula for the candidate steering assistance amount will be described later, if there are a plurality of other obstacles on the same side as the target obstacle, a plurality of candidate steering assistance amounts may be arithmetically operated for the other obstacles, respectively.

The steering assistance amount determination device 230 then selects a maximum value Y1 from the reference steering assistance amount of the target obstacle and the candidate steering assistance amount (or all the candidate steering assistance amounts if there are a plurality of other obstacles on the same side as the target obstacle) (step S204). The maximum value Y1 may be used when the steering assistance amount of the target obstacle is arithmetically operated. If it is determined that there is not another obstacle on the same side as the target obstacle (the step S202: NO), the step S203 and the step S204 described above are omitted.

The steering assistance amount determination device 230 then determines whether or not there is another obstacle on an opposite side to the target obstacle in the lateral direction (step S205). In other words, if the target obstacle is located on the right side as viewed from the vehicle 10, it is determined whether or not there is another obstacle on the left side. If the target obstacle is located on the left side as viewed from the vehicle 10, it is determined whether or not there is another obstacle on the right side.

If it is determined that there is another obstacle on the opposite side to the target obstacle (the step S205: YES), the steering assistance amount determination device 230 arithmetically operates a steeling assistance control amount corresponding to the other obstacle located on the opposite side to the target obstacle (step S206). The steering assistance control amount can be calculated on the basis of the reference steering assistance amount of the other obstacle and the distance (or the longitudinal distance) between the target obstacle and the other obstacle. A specific calculation formula for the steering assistance control amount will be described later. If there are a plurality of other obstacles on the opposite side to the target obstacle, a plurality of steering assistance control amounts may be arithmetically operated for the other obstacles, respectively.

The steering assistance amount determination device 230 then selects a maximum value Y2 from the steering assistance control amount (or all the steering assistance control amounts if there are a plurality of other obstacles on the opposite side to the target obstacle) (step S206). The maximum value Y2 may be used when the steering assistance amount of the target obstacle is arithmetically operated. If it is determined that there is not another obstacle on the opposite side to the target obstacle (the step S205: NO), the step S206 and the step S207 described above are omitted.

The steering assistance amount determination device 230 then determines the steering assistance amount of the target obstacle, on the basis of the maximum value Y1 selected in the step S204 and the maximum value Y2 selected in the step S207. More specifically, the steering assistance amount determination device 230 may determine the steering assistance amount of the target obstacle, by subtracting maximum value Y2 from the maximum value Y1. The candidate steering assistance amount that is a selection candidate for the maximum value Y1 and the candidate steering assistance amount that is a selection candidate for the maximum value Y2 may be, as described above, the values that are arithmetically operated on the basis of the distance between the target object and the other obstacle. Thus, the steering assistance amount arithmetically operated in the steering assistance amount arithmetic process described above is a value that takes into account the distance between the target object and the other obstacle.

<Control Examples of Steering Assistance Control>

Figure 4:
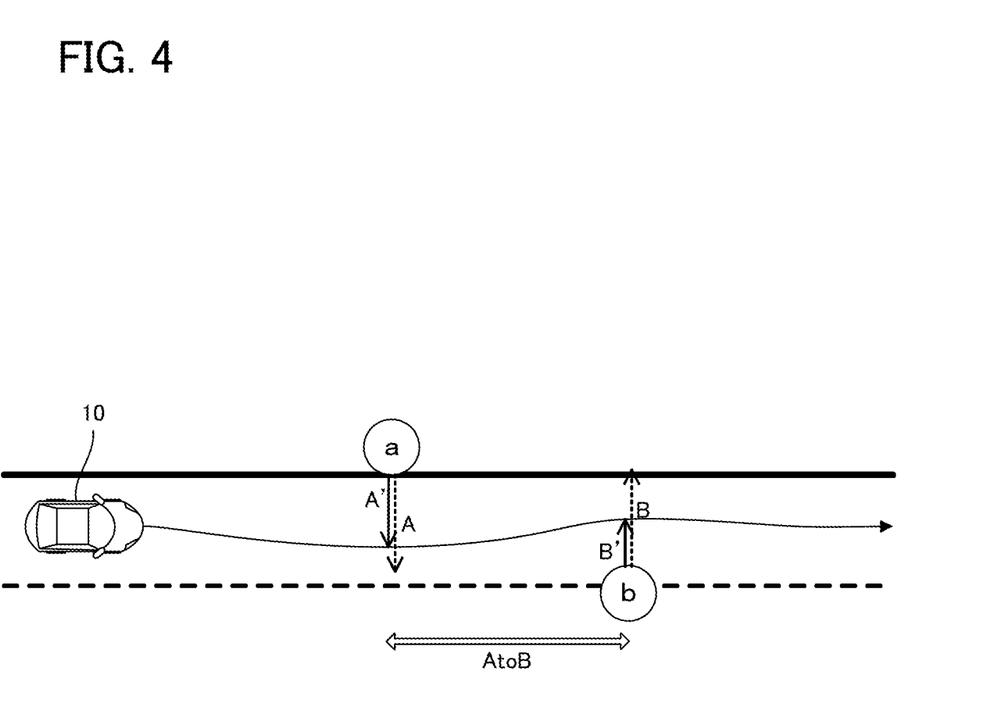
FIG. 4 is a plan view illustrating an example of a steering assistance control when there is an obstacle on each side of left and right sides of a vehicle.
Figure 5:
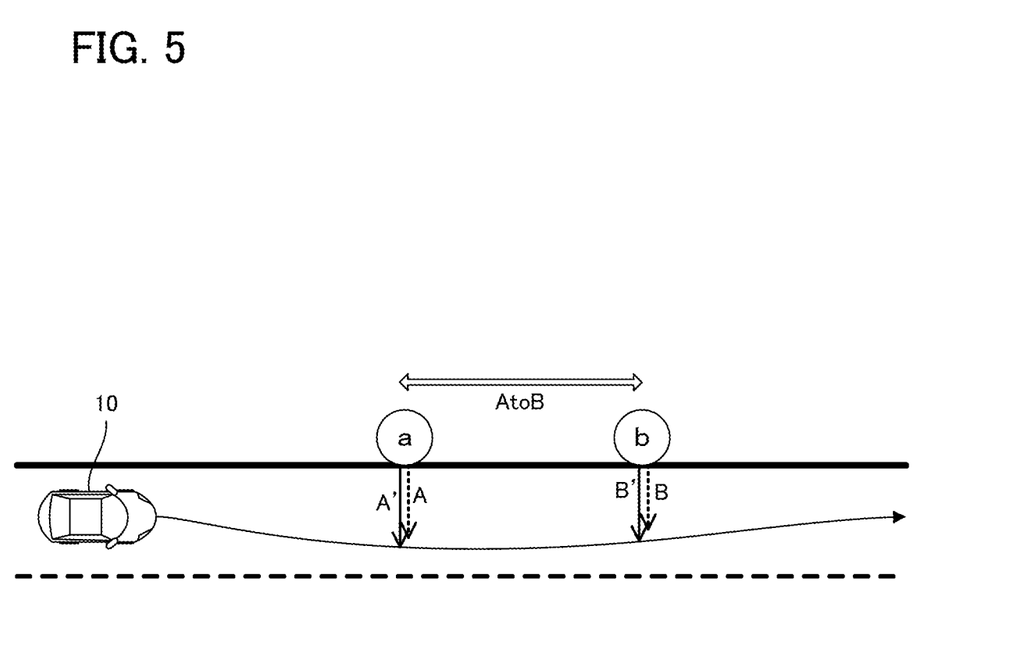
FIG. 5 is a plan view illustrating an example, of the steering assistance control when there are two obstacles on one of the left and right sides of the vehicle.
Figure 6:
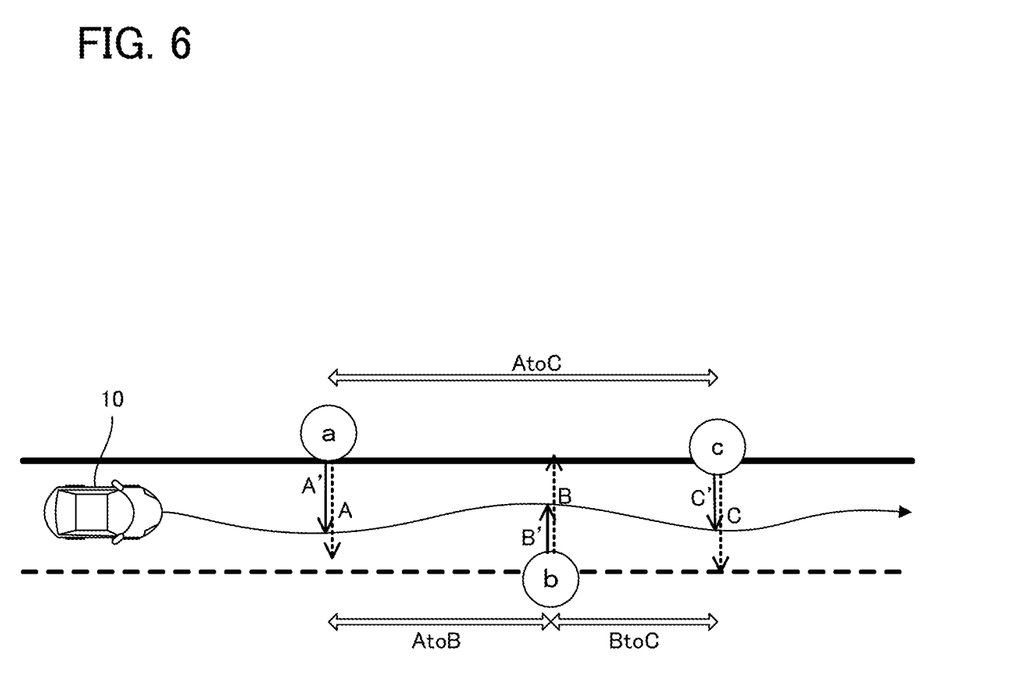
FIG. 6 is a plan view illustrating an example of the steering assistance control when there are three obstacles on both the left and right sides of the vehicle.
Figure 7:
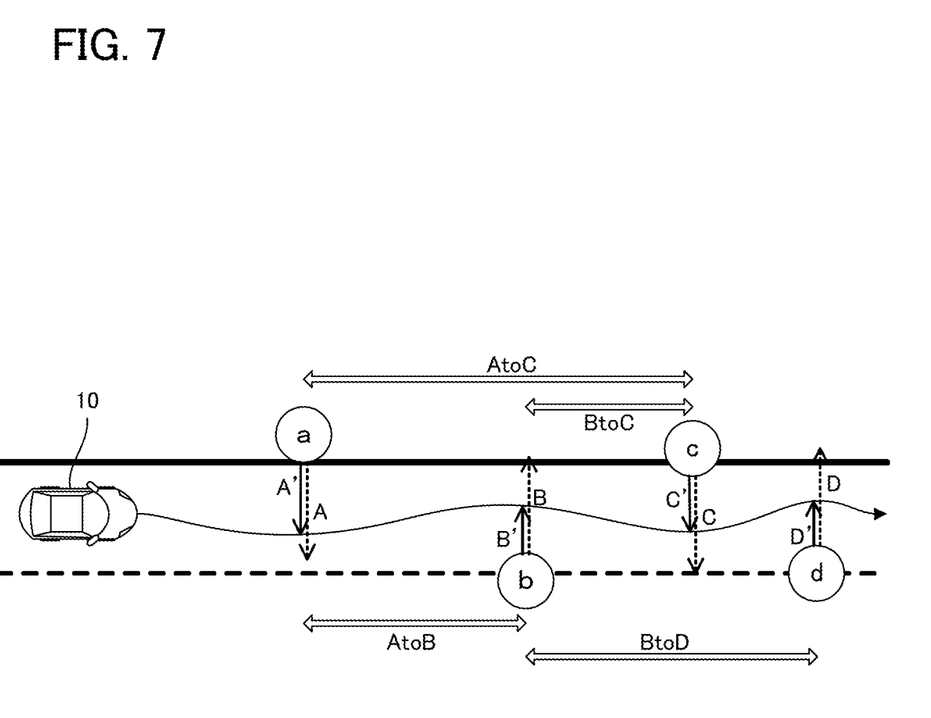
FIG. 7 is a plan view illustrating an example of the steering assistance control when there are four obstacles on both the left and right sides of the vehicle.

Next, specific control examples in the steering assistance control described above (in particular, a method of arithmetically operating the steering assistance amount) will be explained with reference to FIG. 4 to FIG. 7. FIG. 4 is a plan view illustrating an example of the steering assistance control when there is an obstacle on each side of left and right sides of the vehicle. FIG. 5 is a plan view illustrating an example of the steering assistance control when there are two obstacles on one of the left and right sides of the vehicle. FIG. 6 is a plan view illustrating an example of the steering assistance control when there are three obstacles on both the left and right sides of the vehicle. FIG. 7 is a plan view illustrating an example of the steering assistance control when there are four obstacles on both the left and right sides of the vehicle.

(Case in Which There is an Obstacle on Each Side of Left and Right Sides)

As illustrated in FIG. 4, suppose that there is an obstacle a on the left side as viewed from the vehicle 10 and there is an obstacle b on the right side (i.e., on the opposite side to the obstacle a in the lateral direction) as viewed from the vehicle 10. Here, the obstacle a shall be the target obstacle.

In this case, there is no obstacle on the same side in the lateral direction as the obstacle a, which is the target obstacle. Thus, the candidate steering assistance amount is not arithmetically operated, and a reference steering assistance amount A of the obstacle a is selected as the maximum value Y1. On the other hand, there is the obstacle b, which is another obstacle, on the opposite side in the lateral direction to the obstacle a, which is the target obstacle. Thus, a steering assistance control amount corresponding to the obstacle b is arithmetically operated from a reference steering assistance amount B of the obstacle b and a distance AtoB between the obstacle a and the obstacle b. Since there is no other obstacle other than the obstacle b on the opposite side to the obstacle a, the steering assistance control amount corresponding to the obstacle b is selected as the maximum value Y2.

As a result, a steering assistance amount A' of the obstacle a, which is the target obstacle, can be calculated by the following equation (1).

$$A'=A-B^{*}(1-A \text{ to } B/T) \tag{1}$$

Here, "$B^{*}(1-A \text{ to } B/T)$" in the equation (1) is the steering assistance control amount, corresponding to the obstacle b. Here, the steering assistance control amount is reduced with increasing the distance AtoB between the obstacle a and the obstacle b. As a result, the steering assistance amount A' of the obstacle a may be calculated as a value that increases with increasing the distance AtoB between the obstacle a and the obstacle b (or a value that decreases with reducing the distance AtoB between the obstacle a and the obstacle b). "T" in the equation (1) is a weighting factor corresponding to a degree of consideration of the presence of the obstacle b, and can use, for example, a value of a maximum assistance range of the steering assistance control. Moreover, a steering assistance amount B' of the obstacle b can be arithmetically operated in the same principle as those in the equation (1).

(Case in Which there are Two Obstacles on One of Left and Right Sides)

As illustrated in FIG. 5, suppose that there are an obstacle a and an obstacle b on the left side as viewed from the vehicle 10 and there is no obstacle on the right side as viewed from the vehicle 10. Here, the obstacle a shall be the target obstacle.

In this case, there is the obstacle b, which is another obstacle, on the same side in the lateral direction as the obstacle a, which is the target obstacle. Thus, a candidate steering assistance amount corresponding to the obstacle b is arithmetically operated from the reference steering assistance amount B of the obstacle b and the distance AtoB between the obstacle a and the obstacle b. Since there is no other obstacle other than the obstacle b on the same side as the obstacle a, the reference steering assistance amount A of the obstacle a and the candidate steering assistance amount corresponding to the obstacle b may be selection candidates for the maximum value Y1. On the other hand, there is no other obstacle on the opposite side in the lateral direction to the obstacle a, which is the target obstacle. Thus, the candidate steering assistance amount is not arithmetically operated, and there is no selection candidate for the maximum value Y2 (i.e., Y2=0).

As a result, the steering assistance amount A' of the obstacle a, which is the target obstacle, can be calculated by the following equation (2).

$$A'=\max \{A, B^*(1-A \text{ to } B/T)\} \qquad (2)$$

Here, "$B^*(1-A \text{ to } B/T)$" in the equation (2) is the candidate steering assistance amount corresponding to the obstacle b. Here, the candidate steering assistance amount is reduced with increasing the distance AtoB between the obstacle a and the obstacle b. Thus, when the candidate steering assistance amount corresponding to the obstacle b is selected as the maximum value Y1, the steering assistance amount A' of the obstacle a may be calculated as a value that decreases with increasing the distance AtoB between the obstacle a and the obstacle b (or a value that increases with reducing the distance AtoB between the obstacle a and the obstacle b). Moreover, the steering assistance amount B' of the obstacle b can be arithmetically operated in the same principle as those in the equation (2).

(Case in Which There are Three Obstacles on Both Left and Right Sides)

As illustrated in FIG. 6, suppose that there are an obstacle a and an obstacle c on the left side as viewed from the vehicle 10 and there is an obstacle b on the right side as viewed from the vehicle 10 (i.e., on the opposite side to the obstacles a and c in the lateral direction). Here, the obstacle a shall be the target obstacle.

In this case, there is the obstacle c, which is another obstacle, on the same side in the lateral direction as the obstacle a, which is the target obstacle. Thus, a candidate steering assistance amount corresponding to the obstacle c is arithmetically operated from a reference steering assistance amount C of the obstacle c and a distance AtoC between the obstacle a and the obstacle c. Since there is no other obstacle other than the obstacle c on the same side a the obstacle a, the reference steering assistance amount A of the obstacle a a d the candidate steering assistance amount corresponding to the obstacle c may be selection candidates for the maximum value Y1. On the other hand, there is the obstacle b, which is another obstacle, on the opposite side in the lateral direct on to the obstacle a, which is the target obstacle. Thus, the steering assistance control amount corresponding to the obstacle b is arithmetically operated, from the deference steering assistance amount B of the obstacle h and the distance AtoB between the obstacle a and the obstacle b. Since there is no other obstacle other than the obstacle b on the opposite side to the obstacle a, the steering assistance control amount corresponding to the obstacle b is selected as the maximum value Y2.

As a result, the steering assistance amount A' of the obstacle a, which is the target obstacle, can be calculated by the following equation (3).

$$A'=\max\{A,\ C^*(1-A \text{ to } C/T)\}-B^*(1-A \text{ to } B/T) \qquad (3)$$

Here "$C^*(1-A \text{ to } C/T)$" in the equation (3) is the candidate steering assistance amount corresponding to the obstacle c. Here, the candidate steering assistance amount is reduced with increasing the distance AtoC between the obstacle a and the obstacle c. Thus, when the candidate steering assistance amount corresponding to the obstacle c is selected as the maximum value Y1, the steering assistance amount A' of the obstacle a may be calculated as a value that decreases with increasing the distance AtoC between the obstacle and the obstacle c (or a value that increases with reducing the distance AtoC between the obstacle a and the obstacle c). Moreover, "$B^*(1-A \text{ to } B/T)$" is the steering assistance control amount corresponding to the obstacle h. The steering assistance control amount is reduced an increasing the distance AtoB between the obstacle a and the obstacle b. As a result, the steering assistance amount A' of the obstacle a may be calculated as a value that increases with increasing the distance AtoB between the obstacle a and the obstacle b (or a value that decreases with reducing the distance AtoB between the obstacle a and the obstacle b). Moreover, the steering assistance amount 13' of the obstacle b and a steering assistance amount C' of the obstacle c can be arithmetically operated in the same principle as those in the equation (3).

(Case in Which There are Four or More Obstacles on Both Left and Right Sides)

As illustrated in FIG. 7, suppose that there are an obstacle a and an obstacle c on the left side as viewed from the vehicle 10 and there is an obstacle h and an obstacle d on the right side as viewed from the vehicle 10 on the opposite side to the obstacles a and c in the lateral direction). Here, the obstacle b shall be the target obstacle.

In this case, there is the obstacle d, which is another obstacle, on the same side in the lateral direction as the obstacle b, Inch is the target obstacle. Thus, a candid to steering assistance amount corresponding to the obstacle d is arithmetically operated from a reference steering assistance amount D of the obstacle d and a distance BtoD between the obstacle b and the obstacle d. In FIG. 7, there is no other, obstacle other than the obstacle d on the same side as the obstacle b, but if there is, a candidate steering assistance amount corresponding to that obstacle may be arithmetically operated. In that case, the reference steering assistance amount B of the obstacle b, the candidate steering assistance amount corresponding to the obstacle d, and one or a plurality of candidate steering assistance amounts corresponding to other obstacles may be select on candidates for the maximum value Y1. On the other hand, there are the obstacle a and the obstacle c, which are other obstacles, on the opposite side in the lateral direction to the obstacle b, which is the target obstacle. Thus, a steering assistance control amount corresponding to the obstacle a is arithmetically operated from the reference sneering assistance amount A of the obstacle a and the distance AtoB between the obstacle a and the obstacle b, and a steering assistance control amount corresponding to the obstacle c is arithmetically operated from the reference steering assistance amount C of the obstacle c and the distance AtoC between the obstacle a and the obstacle c. In FIG. 7, there is no other obstacle other than the obstacle a and the obstacle c on the opposite side to the obstacle b, but if there is, a steering assistance control amount corresponding to that obstacle may be arithmetically operated. In that case, the steering assistance control amount corresponding to the obstacle a, the candidate steering assistance amount corresponding to the obstacle c, and one or a plurality of steering assistance control amounts corresponding to other obstacles may be selection candidates for the maximum value Y2.

As a result, the steering assistance amount B' of the obstacle b, which is the target obstacle, can be calculated by the following equation (4).

$$B'=\max\{B, D^*(1-B \text{ to } D/T2), \ldots\}-\max\{A^*(1-A \text{ to } B/T), C^*(1-B \text{ to } C/T2), \ldots\} \quad (4)$$

Here, "$D^*(1-B \text{ to } D/T2)$" in the equation (4) is the candidate steering assistance amount corresponding to the obstacle d. If there is an obstacle other than the obstacle d on the same side as the obstacle b, another candidate steering assistance amount may be arithmetically operated in the same manner. Moreover, "$A^*(1-A \text{ to } B/T1)$" is the steering assistance control amount corresponding to the obstacle a, and "$C^*(1-B \text{ to } C/T2)$" is the steering assistance control amount corresponding to the obstacle c. If there is an obstacle other than the obstacle a and the obstacle c on the opposite side to the obstacle b another steering assistance control amount may be arithmetically operated in the same manner. By using the equation (4), it is possible to arithmetically operate the steering assistance amount of the target obstacle even when there are four or more obstacles. Moreover, the steering assistance amount of an obstacle other than the obstacle b can be arithmetically operated in the same principle as those in the equation (4).

The equation (4) further uses two types of values of "T1" and "T2" as weighting factors. These weighting factors are intended to reduce the weighting of an obstacle on a near side of the obstacle b (i.e., an obstacle that is passed earlier than the obstacle b), which is the target obstacle, and are intended to increase the weighting of an obstacle on a far side of the obstacle b (i.e., an obstacle that is passed later than the obstacle b), which is the target obstacle, and the weighting factors are set to satisfy a relation T1>T2. By using the different weighting factors as described above, it is possible to determine the steering assistance amount, in view of a position relation (or specifically a front-rear relation) between the obstacles. T1 can use, for example, a value corresponding to a time that ranges from a passing time of an obstacle that takes into account the length of the vehicle 10 to at most 3 seconds, or a value obtained by multiplying the aforementioned time by a current speed of the vehicle 10. T2 can use, for example, a value corresponding to a time of at most 6 seconds, or a value obtained by multiplying the aforementioned time by the current speed of the vehicle 10.

<Technical Effect>

Next, a technical effect obtained by the vehicle control apparatus 200 according to the embodiment will be explained.

As explained in FIG. 1 to FIG. 7, according to the vehicle control apparatus 200 in the embodiment, if there are a plurality of obstacles ahead of the vehicle 10, the steering assistance amount of the target obstacle may be determined in view of a distance between any two of the obstacles. It is thus possible to determine a more appropriate steering assistance amount, in comparison with those when the steering assistance amount is determined only in view of individual obstacles. Specifically, the candidate steering assistance amount is arithmetically operated for an obstacle located on the same side as the target obstacle in the lateral direction, and as a result, the steering assistance amount that is increased with increasing the distance between the obstacles may be determined. On the other hand, the steering assistance control amount is arithmetically operated for an obstacle located on the opposite side to the target obstacle in the lateral direction, and as a result, the steering assistance amount that is reduced with increasing the distance between the obstacles may be determined. It is therefore possible to determine an appropriate steering assistance amount without excess and deficiency.

For example, in the case illustrated in FIG. 4, the steering is made continuously in opposite directions. Thus, if the distance is short between the obstacle a and the obstacle b, there may be not enough time to make the steering with relatively large reference steering assistance amounts A and B, or the steering may be made quick. In the case illustrated in FIG. 5, there is no change in a steering direction, but if the steering assistance control is performed only in view of the obstacle a on the near side, then, there may be not enough time to make the subsequent steering for the obstacle b, or the steering may be made quick. According to the vehicle control apparatus in the embodiment, it is possible to avoid such a detrimental effect.

Moreover, if there are a plurality of other obstacles on the same side as the target obstacle in the lateral direction (i.e., other obstacles that are targets for arithmetically operating the candidate steering assistance amount), the largest, value may be selected from among a plurality of candidate steering assistance amounts arithmetically operated. In the same manner, if there are a plurality of other obstacles on the opposite side to the target obstacle in the lateral direction (i.e., other obstacles that are targets for arithmetically operating the steering assistance control amount), the largest value may be selected from among a plurality of steering assistance control amounts arithmetically operated. By this, even if there is a deviation between the number of the other obstacles located on the same side as the target obstacle in the lateral direction and the number of the other obstacles located on the opposite side to the target obstacle in the lateral direction, it is possible to prevent, an excessive influence of any one of the situations.

<Supplementary Notes>

Various aspects of embodiments of the present disclosure derived from the embodiment explained above will be explained hereinafter.

(Supplementary Note 1)

A vehicle control apparatus described in Supplementary Note 1 is a vehicle control apparatus configured to perform a steering assistance control of steering a vehicle to move away from an obstacle to avoid when the obstacle is in a steering assistance range, the vehicle control apparatus provided with: a determinator configured to determine a steering assistance amount associated with the steering assistance control for the obstacle, on the basis of a distance between two of a plurality of obstacles in a direction of travel of the vehicle, when the plurality of obstacles are in the steering assistance range; and a controller programmed to control the vehicle to perform the steering assistance control by using the steering assistance amount determined by the determinator.

If there are a plurality of obstacles, the steering assistance control is continuously performed for each of the plurality of obstacles. If the steering assistance control is performed only in view of any one of the obstacles, the steering assistance amount may be excessive or insufficient. However, if the steering assistance control is determined on the basis of the distance between the obstacles (or in other words, on the basis of an interval of the steering assistance controls that are continuously performed), it is possible to perform an appropriate steering assistance control in view of a position relation between the obstacles.

(Supplementary Note 2)

In a vehicle control apparatus described in Supplementary Note 2, when there are a first obstacle and a second obstacle as the obstacles, the determinator is configured to determine the steering assistance amount for the first obstacle, on the basis of (i) a reference steering assistance amount corresponding to the first obstacle, (ii) a reference steering assistance amount corresponding to the second obstacle, and (iii) a distance between the first obstacle and the second obstacle in the direction of travel of the vehicle.

According to the vehicle control apparatus described in Supplementary Note 2, it is possible to determine the steering assistance amount corresponding to the first obstacle, easily and appropriately, by using the reference steering assistance amount corresponding to the first obstacle, the reference steering assistance amount corresponding to the second obstacle, and the distance between the first obstacle and the second obstacle. The "reference steering assistance amount" may be a steering assistance amount applied when there is only one obstacle.

(Supplementary Note 3)

In a vehicle control apparatus described in Supplementary Note 3, when there is the first obstacle on one of left and right, sides as viewed from the vehicle and there is the second obstacle on the other side, the determinator is configured to reduce the steering assistance amount for the first obstacle with reducing the distance between the first obstacle and the second obstacle in the direction of travel of the vehicle.

When the first obstacle and the second obstacle are located on the opposite sides to each other in a lateral direction as viewed from the vehicle, the steering assistance control is performed to steer the vehicle in opposite directions for the first obstacle and the second obstacle. At this time, if the distance is relatively short between the first obstacle and the second obstacle, it is required to continuously perform the steering assistance control in the opposite directions in a relatively short time. Thus, a large steering assistance amount may cause the vehicle to meander significantly, or may not allow the steering assistance control to be performed. In this aspect, however, the steering assistance amount for the first obstacle is reduced with reducing the distance between the first obstacle and the second obstacle, and it is thus possible to perform an appropriate steering assistance control.

(Supplementary Note 4)

In a vehicle control apparatus described in Supplementary Note 4, when there is the first obstacle on one of the left and right sides as viewed from the vehicle and there is the second obstacle on the other side, the determinator is configured to determine the steering assistance amount for the first obstacle, by subtracting a steering assistance control amount, which is obtained from the reference steering assistance amount corresponding to the second obstacle and the distance between the first obstacle and the second obstacle, from the reference steering assistance amount corresponding to the first, obstacle.

According to the vehicle control apparatus described in Supplementary Note 4, it is possible to determine the steering assistance amount corresponding to the first obstacle, easily and appropriately, by subtracting the steering assistance control amount corresponding to the second obstacle, from the reference steering assistance amount corresponding to the first obstacle. The "steering assistance control amount" may be a value indicating how much the reference steering assistance amount is to be reduced (or in other words, how excessive the reference steering assistance amount and may be obtained from information about an obstacle located on the opposite side in the lateral direction to an obstacle required to determine the steering assistance amount (which is herein the reference steering assistance amount corresponding to the second obstacle and the distance between the first obstacle and the second obstacle).

(Supplementary Note 5)

In a vehicle control apparatus described in Supplementary Note 5, when there are the first obstacle and the second obstacle on one of the left and right; sides as viewed from the vehicle, the determinator is configured to determine a larger one of (i) the reference steering assistance amount corresponding to the first obstacle and (ii) a candidate steering assistance amount, which is obtained from the reference steering assistance amount corresponding to the second obstacle and the distance between the first obstacle and the second obstacle, to be the steering assistance amount corresponding to the first obstacle.

According to the vehicle control apparatus described in Supplementary Note 5, it is possible to determine the steering assistance amount corresponding to the first obstacle, easily and appropriately, by selecting a larger one of the reference steering assistance amount corresponding to the first obstacle and the candidate steering assistance amount corresponding to the second obstacle. The "candidate steering assistance amount" may be a value indicating a steering assistance amount that is a candidate of the steering assistance amount corresponding to the first obstacle, and may be obtained from information about an obstacle located on the same side in the lateral direction as an obstacle required to determine the steering assistance amount (which is herein the reference steering assistance amount corresponding to the second obstacle and the distance between the first obstacle and the second obstacle).

(Supplementary Note 6)

In a vehicle control apparatus described in Supplementary Note 6, when there is a first obstacle on one of left and right sides as viewed from the vehicle and there are a second obstacle and a third obstacle on the other side as the obstacles, the determinator is configured to determine the steering assistance amount corresponding to the first obstacle, by subtracting a larger one of (i) a first steering assistance control amount, which is obtained from a reference steering assistance amount corresponding to the second obstacle and a distance between the first obstacle and the second obstacle, and (ii) a second steering assistance control amount, which is obtained from a reference steering assistance amount corresponding to the third obstacle and a distance between the first obstacle and the third obstacle, from a reference steering assistance amount corresponding to the first obstacle.

According to the vehicle control apparatus described in Supplementary Note 6, it is possible to determine the steering assistance amount corresponding to the first obstacle, easily and appropriately, by subtracting a larger one of the first steering assistance control amount corresponding to the second obstacle and the second steering assistance control amount corresponding to the third obstacle, from the reference steering assistance amount corresponding to the first obstacle. As in the case considered in this aspect, if there are a plurality of obstacles on the opposite side in the lateral direction to an obstacle required to calculate the steering assistance amount, it is possible to use the largest value of a plurality of steering assistance control amounts calculated correspondingly to the plurality of obstacles located on the opposite side. This can be applied to a situation in which there are three or more obstacles required to calculate the steering assistance control amount.
(Supplementary Note 7)

In a vehicle control apparatus described in Supplementary Note 7, when there are a first obstacle and a second obstacle on one of left and right sides as viewed from the vehicle and there is a third obstacle on the other side as the obstacles, said determinator is configured to determine the steering assistance amount corresponding to the first obstacle, by subtracting a steering assistance control amount, which is obtained from a reference steering assistance amount corresponding to the third obstacle and a distance between the first obstacle and the third obstacle, from a larger one of (i) a reference steering assistance amount corresponding to the first obstacle and (ii) a candidate steering assistance amount, which is obtained from a reference steering assistance amount corresponding to the second obstacle and a distance between the first obstacle, and the second obstacle.

According to the vehicle control apparatus described in Supplementary Note 7, it is possible to determine the steering assistance amount corresponding to the first obstacle, easily and appropriately, by subtracting the steering assistance control amount corresponding to the third obstacle, from a larger one of the reference steering assistance amount corresponding to the first obstacle and the candidate steering assistance amount corresponding to the second obstacle. As in the case considered in this aspect, if there is an obstacle on the same side in the lateral direction as an obstacle required to calculate the steering assistance amount, it is possible to use the largest value of the reference steering assistance amount corresponding to the obstacle required to calculate the steering assistance amount and the candidate steering assistance amount calculated correspondingly to the obstacle located on the same side. This can be applied to a situation in which there are two or more obstacles required to calculate the candidate steering assistance amount.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus configured to perform a steering assistance control of steering a vehicle to move away from an obstacle to avoid when the obstacle is in a steering assistance range, said vehicle control apparatus comprising an electronic control unit configured to:
determine a steering assistance amount associated with the steering assistance control for a first obstacle of a plurality of obstacles, on the basis of (i) a reference steering assistance amount corresponding to the first obstacle of the plurality of obstacles, (ii) a reference steering assistance amount corresponding to a second obstacle of the plurality of obstacles, and (iii) a longitudinal distance between the first obstacle and the second obstacle of the plurality of obstacles in a direction of travel of the vehicle, wherein the steering assistance amount for the first obstacle increases or decreases from the reference steering assistance amount corresponding to the first obstacle as a function of the longitudinal distance between the first obstacle and the second obstacle, when the plurality of obstacles are in the steering assistance range; and
control the vehicle to perform the steering assistance control by using the determined steering assistance amount.

2. The vehicle control apparatus according to claim 1, wherein when there is the first obstacle on one of left and right sides as viewed from the vehicle and there is the second obstacle on the other side, the electronic control unit is further configured to reduce the steering assistance amount for the first obstacle with reducing the longitudinal distance between the first obstacle and the second obstacle in the direction of travel of the vehicle.

3. The vehicle control apparatus according to claim 2, wherein when there is the first obstacle on one of the left and right sides as viewed from the vehicle and there is the second obstacle on the other side, the electronic control unit is further configured to determine the steering assistance amount for the first obstacle, by subtracting a steering assistance control amount, which is obtained from the reference steering assistance amount corresponding to the second obstacle and the longitudinal distance between the first obstacle and the second obstacle, from the reference steering assistance amount corresponding to the first obstacle.

4. The vehicle control apparatus according to claim 1, wherein when there are the first obstacle and the second obstacle on one of the left and right sides as viewed from the vehicle, the electronic control unit is further configured to determine a larger one of (i) the reference steering assistance amount corresponding to the first obstacle and (ii) a candidate steering assistance amount, which is obtained from the reference steering assistance amount corresponding to the second obstacle and the longitudinal distance between the first obstacle and the second obstacle, to be the steering assistance amount corresponding to the first obstacle.

5. The vehicle control apparatus according to claim 1, wherein when there is a first obstacle on one of left and right sides as viewed from the vehicle and there are a second obstacle and a third obstacle on the other side as the plurality of obstacles, the electronic control unit is further configured to determine the steering assistance amount corresponding to the first obstacle, by subtracting a larger one of (i) a first steering assistance control amount, which is obtained from a reference steering assistance amount corresponding to the second obstacle and the longitudinal distance between the first obstacle and the second obstacle, and (ii) a second steering assistance control amount, which is obtained from a reference steering assistance amount corresponding to the third obstacle and a longitudinal distance between the first obstacle and the third obstacle, from a reference steering assistance amount corresponding to the first obstacle.

6. The vehicle control apparatus according to claim 1, wherein when there are a first obstacle and a second obstacle on one of left and right sides as viewed from the vehicle and there is a third obstacle on the other side as the plurality of obstacles, the electronic control unit is further configured to determine the steering assistance amount corresponding to the first obstacle, by subtracting a steering assistance control amount, which is obtained from a reference steering assistance amount corresponding to the third obstacle and a longitudinal distance between the first obstacle and the third obstacle, from a larger one of (i) a reference steering assistance amount corresponding to the first obstacle and (ii) a candidate steering assistance amount, which is obtained from a reference steering assistance amount corresponding to the second obstacle and a distance between the first obstacle and the second obstacle.

7. A vehicle control method for performing a steering assistance control of steering a vehicle to move away from an obstacle to avoid when the obstacle is in a steering assistance range, said method comprising:
    determining a steering assistance amount associated with the steering assistance control for a first obstacle of a plurality of obstacles, on the basis of (i) a reference steering assistance amount corresponding to the first obstacle of the plurality of obstacles, (ii) a reference steering assistance amount corresponding to a second obstacle of the plurality of obstacles, and (iii) a longitudinal distance between the first obstacle and the second obstacle of the plurality of obstacles in a direction of travel of the vehicle, wherein the steering assistance amount for the first obstacle increases or decreases from the reference steering assistance amount corresponding to the first obstacle as a function of the longitudinal distance between the first obstacle and the second obstacle, when the plurality of obstacles are in the steering assistance range; and
    controlling the vehicle to perform the steering assistance control by using the determined steering assistance amount.

8. The method according to claim 7, wherein when there is the first obstacle on one of left and right sides as viewed from the vehicle and there is the second obstacle on the other side, the method further comprises reducing the steering assistance amount for the first obstacle with reducing the longitudinal distance between the first obstacle and the second obstacle in the direction of travel of the vehicle.

9. The method according to claim 8, wherein when there is the first obstacle on one of the left and right sides as viewed from the vehicle and there is the second obstacle on the other side, the method further comprises determining the steering assistance amount for the first obstacle, by subtracting a steering assistance control amount, which is obtained from the reference steering assistance amount corresponding to the second obstacle and the longitudinal distance between the first obstacle and the second obstacle, from the reference steering assistance amount corresponding to the first obstacle.

10. The method according to claim 7, wherein when there are the first obstacle and the second obstacle on one of the left and right sides as viewed from the vehicle, the method further comprises determining a larger one of (i) the reference steering assistance amount corresponding to the first obstacle and (ii) a candidate steering assistance amount, which is obtained from the reference steering assistance amount corresponding to the second obstacle and the longitudinal distance between the first obstacle and the second obstacle, to be the steering assistance amount corresponding to the first obstacle.

11. The method according to claim 7, wherein when there is a first obstacle on one of left and right sides as viewed from the vehicle and there are a second obstacle and a third obstacle on the other side as the plurality of obstacles, the method further comprises determining the steering assistance amount corresponding to the first obstacle, by subtracting a larger one of (i) a first steering assistance control amount, which is obtained from a reference steering assistance amount corresponding to the second obstacle and the longitudinal distance between the first obstacle and the second obstacle, and (ii) a second steering assistance control amount, which is obtained from a reference steering assistance amount corresponding to the third obstacle and a longitudinal distance between the first obstacle and the third obstacle, from a reference steering assistance amount corresponding to the first obstacle.

12. The method according to claim 7, wherein when there are a first obstacle and a second obstacle on one of left and right sides as viewed from the vehicle and there is a third obstacle on the other side as the plurality of obstacles, the method further comprises determining the steering assistance amount corresponding to the first obstacle, by subtracting a steering assistance control amount, which is obtained from a reference steering assistance amount corresponding to the third obstacle and a longitudinal distance between the first obstacle and the third obstacle, from a larger one of (i) a reference steering assistance amount corresponding to the first obstacle and (ii) a candidate steering assistance amount, which is obtained from a reference steering assistance amount corresponding to the second obstacle and a distance between the first obstacle and the second obstacle.

13. A non-transitory computer readable memory for perform a steering assistance control of steering a vehicle to move away from an obstacle to avoid when the obstacle is in a steering assistance range, the non-transitory computer readable memory comprising instructions, which when executed by a computer, cause the computer to carry out steps comprising:
    determining a steering assistance amount associated with the steering assistance control for a first obstacle of a plurality of obstacles, on the basis of (i) a reference steering assistance amount corresponding to the first obstacle of the plurality of obstacles, (ii) a reference steering assistance amount corresponding to a second obstacle of the plurality of obstacles, and (iii) a longitudinal distance between the first obstacle and the second obstacle of the plurality of obstacles in a direction of travel of the vehicle, wherein the steering assistance amount for the first obstacle increases or decreases from the reference steering assistance amount corresponding to the first obstacle as a function of the longitudinal distance between the first obstacle and the second obstacle, when the plurality of obstacles are in the steering assistance range; and
    controlling the vehicle to perform the steering assistance control by using the determined steering assistance amount.

* * * * *